(12) United States Patent
Kinoshita

(10) Patent No.: US 11,440,299 B2
(45) Date of Patent: Sep. 13, 2022

(54) DECORATIVE SHEET, DECORATIVE MATERIAL, AND METHOD OF PRODUCING DECORATIVE SHEET

(71) Applicant: TOPPAN PRINTING CO., LTD., Tokyo (JP)

(72) Inventor: Kazuki Kinoshita, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 146 days.

(21) Appl. No.: 16/884,504

(22) Filed: May 27, 2020

(65) Prior Publication Data
US 2020/0282711 A1    Sep. 10, 2020

Related U.S. Application Data

(63) Continuation of application No. PCT/JP2019/001086, filed on Jan. 16, 2019.

(30) Foreign Application Priority Data

Jan. 17, 2018    (JP) .............................. JP2018-005909

(51) Int. Cl.
*B32B 27/08*    (2006.01)
*B32B 27/32*    (2006.01)
(Continued)

(52) U.S. Cl.
CPC .............. *B32B 27/08* (2013.01); *B32B 27/32* (2013.01); *B32B 27/36* (2013.01); *B32B 37/02* (2013.01);
(Continued)

(58) Field of Classification Search
CPC ................................................. B32B 2307/538
See application file for complete search history.

(56) References Cited

U.S. PATENT DOCUMENTS

2013/0164541 A1    6/2013    Suwa et al.

FOREIGN PATENT DOCUMENTS

JP    2008-208364 A    9/2008
JP    2013-123863 A    6/2013
(Continued)

OTHER PUBLICATIONS

Machine translation of JP2015066791A (Year: 2015).*
(Continued)

*Primary Examiner* — Ian A Rummel
(74) *Attorney, Agent, or Firm* — Foley & Lardner LLP

(57) ABSTRACT

A decorative sheet that includes at least a thermoplastic resin substrate layer, a transparent thermoplastic resin layer and a surface protective layer in this order. The surface protective layer is formed by laminating at least two layers. At least a second surface protective layer, which constitutes an outermost layer that is a layer located furthest from the transparent thermoplastic resin layer among layers constituting the surface protective layer contains an ionizing radiation-curable resin containing a multifunctional hexamethylene diisocyanate oligomer at a weight ratio of 60% or more. The arithmetic mean height of a profile curve measured from the second surface protective layer in accordance with JIS B 0601 is 15 μm or more, and the maximum height of the profile curve is 38 μm or more.

13 Claims, 1 Drawing Sheet

(51) Int. Cl.
 *B32B 27/36* (2006.01)
 *B32B 37/02* (2006.01)
 *B32B 38/00* (2006.01)
 *E04F 15/16* (2006.01)

(52) U.S. Cl.
 CPC ........ *B32B 38/145* (2013.01); *B32B 2255/10* (2013.01); *B32B 2323/10* (2013.01); *B32B 2398/20* (2013.01); *B32B 2451/00* (2013.01); *B32B 2471/00* (2013.01); *E04F 15/16* (2013.01)

(56) References Cited

FOREIGN PATENT DOCUMENTS

| JP | 2013-537857 A | 10/2013 |
|----|---------------|---------|
| JP | 2015-066791 A | 4/2015  |

OTHER PUBLICATIONS

International Searching Authority, "International Search Report," issued in connection with International Patent Application No. PCT/JP2019/001086, dated Apr. 9, 2019.

International Searching Authority, "Written Opinion," issued in connection with International Patent Application No. PCT/JP2019/001086, dated Apr. 9, 2019.

\* cited by examiner

DECORATIVE SHEET, DECORATIVE MATERIAL, AND METHOD OF PRODUCING DECORATIVE SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/001086, filed on Jan. 16, 2019, which is based upon and claims the benefit of priority to Japanese Patent Application No. 2018-005909, filed on Jan. 17, 2018, the disclosures of which are all incorporated herein by reference in their entireties.

TECHNICAL FIELD

The present invention relates to a method of producing a decorative sheet, a decorative sheet obtained by this production method, and a decorative material including this decorative sheet.

BACKGROUND

Decorative sheets have been developed and advanced in the process of growth of the residential building industry. In particular, apartments and condominiums, which are collective residences, and prefabricated houses, which are individual residences, have played the leading role.

Residential buildings have been conventionally built of materials such as wood and stone indigenous to each region in styles rooted in each intrinsic culture. However, as industrialization spreads with advancement of the residential building industry, materials tend to change from natural materials to artificial materials. In addition, heavy use has been made of expensive wood and stone as materials for residential buildings in recent years, which may lead to a risk of deforestation and environmental problem, also contributes to expansion of demand for decorative sheets.

Therefore, decorative sheets are recently required to have sheet surfaces with improved scratch resistance.

However, decorative sheets are also required to have designability. Therefore, there is a technology of forming projections and recesses on the surface of a decorative sheet for improving designability as disclosed in PTL 1.

CITATION LIST

[Patent Literature] [PTL 1] JP 2013-123863 A

SUMMARY OF THE INVENTION

Technical Problem

However, the technology disclosed in PTL 1 has a problem in that since projections of projections and recesses formed on the surface of the decorative sheet receive external load at one point, scratches are likely to occur.

The present invention has been achieved in view of the above-described circumstances and has as its object to provide a decorative sheet, a decorative material, and a method of producing a decorative sheet, which can better suppress occurrence of scratches even when projections and recesses are formed on the surface of the decorative sheet.

Solution to Problem

To improve or even solve the above-described problem, an aspect of the present invention is a decorative sheet that includes at least a thermoplastic resin substrate layer, a transparent thermoplastic resin layer and a surface protective layer in this order. The surface protective layer is formed by laminating at least two layers. At least an outermost layer that is a layer located furthest from the transparent thermoplastic resin layer among layers constituting the surface protective layer contains an ionizing radiation-curable resin containing a multifunctional hexamethylene diisocyanate oligomer at a weight ratio of 60% or more. Also, the arithmetic mean height of a profile curve measured from the outermost layer in accordance with JIS B 0601 is 15 μm or more, and the maximum height of the profile curve is 38 μm or more.

Also, to improve or even solve the above-described problem, an aspect of the present invention is a decorative material that includes the decorative sheet, an adhesive layer, and a base material. The adhesive layer is provided on a surface of the thermoplastic resin substrate layer on a side facing a surface closer to the transparent thermoplastic resin layer, and contains an adhesive. The substrate is bonded to the thermoplastic resin substrate layer through the adhesive contained in the adhesive layer.

Also, to improve or even solve the above-described problem, an aspect of the present invention is a method of producing a decorative sheet that includes a transparent thermoplastic resin layer forming process and a surface protective layer forming process. The transparent thermoplastic resin layer forming process is a process of forming a transparent thermoplastic resin layer on one surface of a thermoplastic resin substrate layer. The surface protective layer forming process is a process of forming a surface protective layer formed by laminating at least two layers on the transparent thermoplastic resin layer. In the surface protective layer forming process, an outermost layer is formed such that it contains an ionizing radiation-curable resin containing a multifunctional hexamethylene diisocyanate oligomer at a weight ratio of 60% or more. Furthermore, the outermost layer is formed such that the arithmetic mean height of a profile curve measured from the outermost layer in accordance with JIS B 0601 is 15 μm or more, and the maximum height of the profile curve is 38 μm or more.

Advantageous Effects of the Invention

Since the hardness of the outermost layer constituting the surface of the decorative sheet can be improved according to an aspect of the present invention, scratch resistance on the surface of the decorative sheet can be improved. Also, since the configuration of projections and recesses is defined by the profile curve of the outermost layer from which the arithmetic mean height and the maximum height were identified, a contact area when external load is applied can be reduced.

Therefore, there can be provided a decorative sheet, a decorative material, and a method of producing a decorative sheet, which can suppress occurrence of scratches even when projections and recesses are formed on the surface of the decorative sheet.

DETAILED DESCRIPTION

Figure 1:
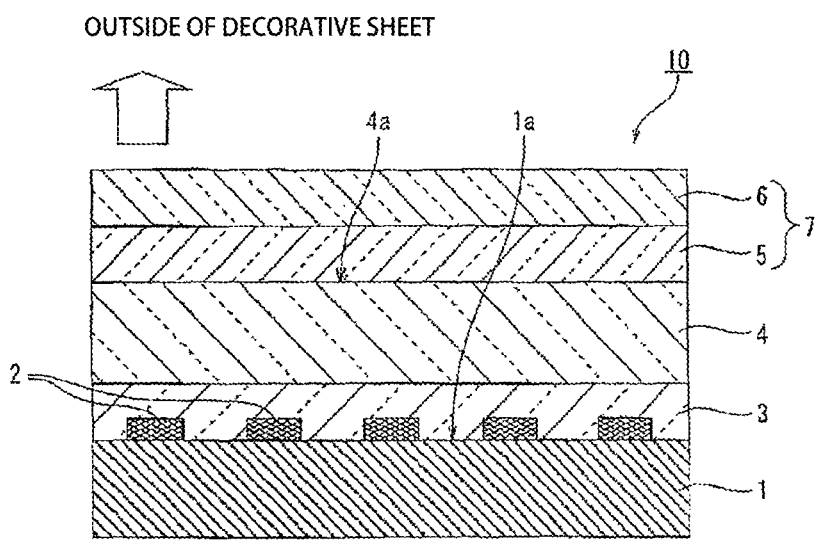
FIG. 1 is a cross-sectional diagram showing a configuration of a decorative sheet according to the first embodiment of the present invention.

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., may be different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

The first embodiment of the present invention will be described below with reference to the drawings. In the following description of the drawings, components identical with or similar to each other are given the same or similar reference signs. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationship or ratio may be different between the drawings.

The first embodiment described below only exemplifies a configuration of embodying the technical idea of the present invention. The technical idea of the present invention should not limit the materials, shapes, structures, layouts and the like of components to those described below. The technical idea of the present invention can be variously modified within the technical scope defined by the claims. Also, "left and right" directions and "upper and lower" directions in the following description are merely a definition for convenience of explanation, and do not restrict the technical idea of the present invention. Therefore, for example, "left and right" and "upper and lower" are switched with each other if the paper sheet is rotated by 90 degrees, and "left" becomes "right" while "right" becomes "left" if the paper sheet is rotated by 180 degrees.

First Embodiment

Hereinafter, the first embodiment of the present invention will now be described with reference to the drawings.
(Decorative Sheet)
<Configuration>
As shown in FIG. 1, a decorative sheet 10 includes a thermoplastic resin substrate layer 1, a pattern layer 2, a transparent adhesive layer 3, a transparent thermoplastic resin layer 4, and a surface protective layer 7.

The thickness of the decorative sheet 10 is preferably in the range of 40 [μm] or more and less than 500 [μm], more preferably in the range of 60 [μm] or more and 425 [μm] or less.

Hereinafter, components of the decorative sheet 10 will now be specifically described.
(Thermoplastic Resin Substrate Layer)

The thermoplastic resin substrate layer 1 is formed with, for example, colored thermoplastic resin.

Examples of thermoplastic resin to be used can be a vinyl chloride resin, acrylic resin, polyolefin-based polypropylene resin, and polyethylene resin. However, in terms of environmental compatibility, processability, and price, a polyolefin-based resin is suitably used.

Grades and compositions of the thermoplastic resin are selected in consideration of, for example, sheeting easiness, printability, and bending suitability.

The thermoplastic resin substrate layer 1 is formed with a polyolefin-based resin or a polyester-based resin each having a thickness in the range of 10 [μm] or more and 200 μm or less. This is because when the thermoplastic resin substrate layer 1 is thinner than 10 [μm], concealing properties and processability may decrease, and when the thermoplastic resin substrate layer 1 is thicker than 200 [μm], performance such as bending processability decreases.

In coloring the thermoplastic resin substrate layer 1, hue can be appropriately selected to conceal a substrate to be bonded to the decorative sheet 10, or as a base color of the pattern layer 2. For example, in sheeting the thermoplastic resin, a colorant such as a pigment may be mixed or kneaded therein for coloring. Alternatively, prior to providing the pattern layer 2, a colored layer may be provided as a solid ink layer under the pattern layer 2 by using a coating or printing technique.

(Pattern Layer)

The pattern layer 2 is a layer provided to the thermoplastic resin substrate layer 1 on the side of a front surface 1a, and can be provided by a known printing technique.

For example, when the thermoplastic resin substrate layer 1 is prepared in the form of a roll, printing for forming the pattern layer 2 can be performed in a roll-to-roll printing apparatus. The printing technique is not particularly limited, and for example, gravure printing may be used in consideration of productivity and quality of the design.

Any pattern may be used for the pattern layer 2 considering designability as the decorative material. For wood patterns, various types of wood grain patterns are often preferably used. In addition to wood grain patterns, cork may be used as a pattern. For example, in the case where a pattern represents a floor of stone such as marble, a pattern of marble stone grain or the like may be used. In addition to the patterns of such natural materials, artificial patterns such as those in a motif of natural materials or geometric patterns may be used as well.

The printing ink for forming the pattern layer 2 is not particularly limited, and is suitably selected and used depending on the printing method. Especially, the ink is preferably selected considering adhesion and printability to the thermoplastic resin substrate layer 1 and weather resistance as a decorative material.

If necessary, an adhesive layer (not shown) may be provided on the pattern layer 2 for the purpose of improving adhesion between the pattern layer 2 and the transparent adhesive layer 3. In that case, a resin used for the adhesive layer is not particularly limited, and can be, for example, a two-component curable urethane resin. The adhesive layer can be provided using a coating apparatus, a gravure printer, or the like.

(Transparent Adhesive Layer)

The transparent adhesive layer 3 is a layer provided on the pattern layer 2, and is provided for the purpose of strengthening adhesion of the thermoplastic resin substrate layer 1 and the pattern layer 2 to the transparent thermoplastic resin layer 4. This is because when adhesion of the thermoplastic resin substrate layer 1 and the transparent thermoplastic resin layer 4 to the pattern layer 2 is strengthened, the decorative sheet 10 can have bending processability, which is an ability to follow a curved surface and a right angle surface.

It is noted that the expression "provided on the pattern layer 2" regarding the transparent adhesive layer 3 means that the transparent adhesive layer 3 is provided on the pattern layer 2, including a case where another layer is interposed between the pattern layer 2 and the transparent adhesive layer 3. The expression "on" as used herein for describing the relationship between other layers also has the same meaning.

The transparent adhesive layer 3 is colorless and transparent, or colored and transparent, or may be colored to a degree that allows visible light to pass through.

The transparent adhesive layer 3 is formed with a polyethylene-based resin or a polypropylene-based resin each having a thickness in the range of 5 [μm] or more and 30 [μm] or less. This is because when the thickness of the transparent adhesive layer 3 is thinner than 5 [μm], insufficient adhesion strength may cause a decrease in peel strength, and when the thickness of the transparent adhesive layer 3 is thicker than 30 [μm], performance such as scratch resistance and load bearing properties may decrease.

In the first embodiment, a case where the transparent adhesive layer 3 is formed with a polyethylene-based resin or a polypropylene-based resin each having a thickness in the range of 10 [μm] or more and 30 [μm] or less will be described.

(Transparent Thermoplastic Resin Layer)

The transparent thermoplastic resin layer 4 is a layer provided on the transparent adhesive layer 3. Thus, the pattern layer 2 is interposed between the thermoplastic resin substrate layer 1 and the transparent thermoplastic resin layer.

Also, the transparent thermoplastic resin layer 4 is formed with, for example, a vinyl chloride resin, acrylic resin, polyolefin-based polypropylene resin, polyethylene resin, or the like. In particular, a polyolefin-based resin is suitably used in terms of environmental compatibility, processability, and price.

The grade and composition of a resin with which the transparent thermoplastic resin layer 4 is formed are selected considering, for example, sheeting easiness, printability, and bending suitability. In selecting, it is particularly important to consider bending processability such that whitening or cracking of a bent portion does not occur.

The transparent adhesive layer 3 and the transparent thermoplastic resin layer 4 can be formed by, for example, simultaneously extruding both (the transparent adhesive layer 3 and the transparent thermoplastic resin layer 4) by coextrusion.

The transparent thermoplastic resin layer 4 provides the decorative sheet 10 with the effect of adding the impression of thickness and depth to the design. In addition, the transparent thermoplastic resin layer 4 improves weather resistance and abrasion resistance of the decorative sheet 10.

The transparent thermoplastic resin layer 4 is colorless and transparent, or colored and transparent, or may be colored to a degree that allows visible light to pass through.

The transparent thermoplastic resin layer 4 is formed with a polyolefin-based resin or a polyester-based resin each having a thickness in the range of 30 [μm] or more and 200 [μm] or less. This is because when the transparent thermoplastic resin layer 4 is thinner than 30 [μm], performance such as scratch resistance and abrasion resistance may decrease, and when the transparent thermoplastic resin layer 4 is thicker than 200 [μm], performance such as bending processability may decrease.

In the first embodiment, a case in which the transparent thermoplastic resin layer 4 is formed with a polyethylene-based resin or a polypropylene-based resin each having a thickness in the range of 50 [μm] or more and 150 [μm] or less will be described.

(Surface Protective Layer)

The surface protective layer 7 is a layer formed on the transparent thermoplastic resin layer 4, and a laminated film formed by laminating two layers. A layer constituting the surface protective layer 7 can contain, for example, a flatting agent such as a silica filler.

The thickness of the surface protective layer 7 is, for example, in the range of 3 [μm] or more and 50 [μm] or less.

Specifically, the surface protective layer 7 includes, as two layers, a first surface protective layer 5 and a second surface protective layer 6.

The first surface protective layer 5 is a layer laminated to the transparent thermoplastic resin layer 4.

The thickness of the first surface protective layer 5 is in the range of equal to or more than 1 [μm] and less than 30 [μm]. This is because when the first surface protective layer 5 is thinner than 1 [μm], performance such as scratch resistance and abrasion resistance may decrease. This is because the transparent thermoplastic resin layer 4 is thicker than 200 [μm], performance such as bending processability may decrease.

The second surface protective layer 6 constitutes an outermost layer that is a layer provided furthest from the transparent thermoplastic resin layer 4 among the layers constituting the surface protective layer 7.

Also, the second surface protective layer 6 (outermost layer) is formed such that it contains an ionizing radiation-curable resin containing a multifunctional hexamethylene diisocyanate oligomer at a weight ratio of 60% or more.

The ionizing radiation-curable resin as described herein refers to a synthetic resin which chemically changes from liquid to solid in response to application of the energy of ionizing radiation (for example, UV light, α-rays, β-rays, or γ-rays). Examples of the ionizing radiation-curable resin to be used may include a monomer, a prepolymer or a polymer each having a radical polymerizable unsaturated group such as (meth)acryloyl group and (meth)acryloyloxy group or a cation polymerizable functional group such as epoxy group. These monomers, prepolymers, and polymers may be singly used, or may be plurally used in combination. For example, a UV-curable resin and an electron beam-curable resin may be used.

The multifunctional hexamethylene diisocyanate oligomer in the present embodiment refers to, for example, a molecule that has a backbone in which two or more molecules of hexamethylene diisocyanate polymerize, and a plurality of functional groups. The backbone of the multifunctional hexamethylene diisocyanate oligomer in the present embodiment is preferably a trimer, particularly preferably an adduct, a biuret or a nurate. For example, 50% in weight ratio of the oligomer in the present embodiment may be a dimer or a trimer.

Here, the UV-curable resin refers to a synthetic resin which chemically changes from liquid to solid in response to application of the energy of UV light. Therefore, when a small amount of UV energy is supplied, curing becomes insufficient resulting in a semi-solid state. On the other hand, when a large amount of UV energy is supplied, the generated heat causes failures such as flares and wrinkles in the decorative sheet 10.

Here, an example of a photoreaction initiator used as a sub-component of the UV-curable resin may include an alkylphenone-based photopolymerization initiator.

Examples of a UV irradiation source to be used may include light sources such as a super high-pressure mercury lamp, high pressure mercury lamp, low pressure mercury lamp, carbon arc lamp, black light, and metal halide lamp. The wavelength of UV light is suitably in the range of 190 [nm] or more and 380 [nm] or less. The integrated light quantity of UV irradiation is set in the range of equal to or more than 100 [mJ/cm 2] and less than 400 [mJ/cm2].

The arithmetic mean height of a profile curve measured from the second surface protective layer 6 in accordance with JIS B 0601 is 15 [μm] or more. Also, the arithmetic mean height of the profile curve may be 30 [μm] or less.

The maximum height of the profile curve is 38 [μm] or more. Also, the maximum height of the profile curve may be 80 [μm] or less.

The maximum height of the profile curve may be equal to or more than 2.0 times and equal to or less than 3.0 times the arithmetic mean height of the profile curve, more preferably equal to or more than 2.4 times and equal to or less than 2.7 times. When the maximum height of the profile curve is within the above-described value range, occurrence of scratches can be further suppressed while the projections and recesses on the surface of the decorative sheet are reliably maintained.

The measurement condition of arithmetic mean height is, for example, the method of the JIS 2001 standard, with a Gaussian filter, and λs=2.5 μm.

The above-described "JIS B 0601" is, for example, JIS B 0601-1994 or JIS B 0601-1997.

The arithmetic mean height of a profile curve measured from the second surface protective layer 6 even in accordance with ISO 25178 is 15 [μm] or more. Also, the arithmetic mean height of the profile curve may be 30 [μm] or less.

Further, even in the case of conforming to ISO 25178 or ISO 25178, the maximum height of the cross-sectional curve measured from the second surface protective layer 6 may be 38 [μm] or more. Also, the maximum height of the profile curve may be 80 [μm] or less.

The "arithmetic mean height" represents the mean value of height of profile curve elements in a reference length. The profile element refers to a set of a neighboring crest and trough. In this case, the minimum height and minimum length of the crest (trough) constituting the profile element are defined. The crest (trough) having a height (depth) being equal to or less than 10% of the maximum height or a length being equal to or less than 1% of the length of the calculation section is regarded as a noise, and recognized as a part of the previous or subsequent crest (trough).

<Method of Producing Decorative Sheet>

The method of producing the decorative sheet 10 according to the present embodiment includes a transparent thermoplastic resin layer forming process and a surface protective layer forming process.

The transparent thermoplastic resin layer forming process is a process of forming the transparent thermoplastic resin layer 4 on one surface (front surface 1a) of the thermoplastic resin substrate layer 1.

The surface protective layer forming process is a process of forming the surface protective layer 7 on the transparent thermoplastic resin layer 4.

In the surface protective layer forming process, the second surface protective layer 6, which constitutes the outermost layer among the layers constituting the surface protective layer 7, is formed such that it contains an ionizing radiation-curable resin containing a multifunctional hexamethylene diisocyanate oligomer at a weight ratio of 60% or more.

Furthermore, in the surface protective layer forming process, the second surface protective layer 6 constituting the outermost layer is formed such that the arithmetic mean height of a profile curve measured from the second surface protective layer 6 in accordance with JIS B 0601 is 15 [μm] or more, and the maximum height of the profile curve is 38 [μm] or more.

(Decorative Material)

Next, a decorative material according to the first embodiment will be described.

Figure 2:
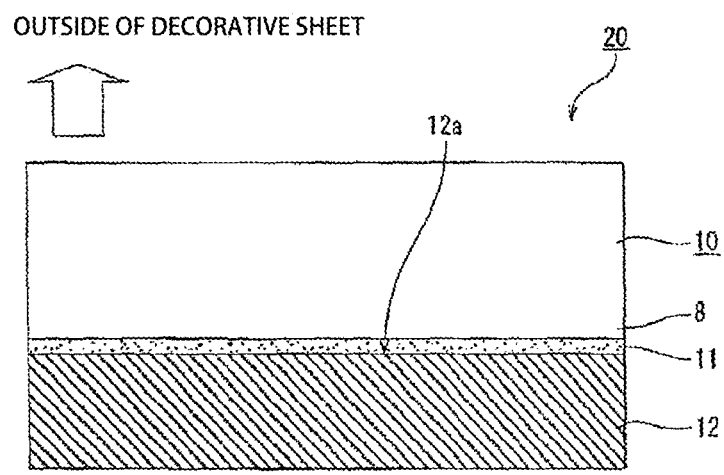
FIG. 2 is a cross-sectional diagram showing a configuration of a decorative plate according to the first embodiment of the present invention.

As shown in FIG. 2, a decorative material 20 of the first embodiment includes the decorative sheet 10, an adhesive layer 11, and a substrate 12.

The adhesive layer 11 is a layer that is provided on a surface (rear surface 1b) of the thermoplastic resin substrate layer 1 on a side facing a surface (front surface 1a) closer to the transparent thermoplastic resin layer 4, and contains an adhesive.

Examples of the adhesive contained in the adhesive layer 11 may include adhesives based on thermoplastic resin, thermocurable resin, rubber (elastomer), and the like. These adhesives can be appropriately selected and used from known or commercially available products.

A thermoplastic resin rear surface layer 8, which is provided on the rear surface 1b of the thermoplastic resin substrate layer 1, is interposed between the adhesive layer 11 and the decorative sheet 10.

The substrate 12 faces the decorative sheet 10 with the adhesive layer 11 therebetween, and bonded to the decorative sheet 10 through the adhesive layer 11. That is, the substrate 12 is bonded to the thermoplastic resin substrate layer 1 through the adhesive contained in the adhesive layer 11. Thus, in the decorative material 20, the decorative sheet 10 is provided on one surface 12a of the substrate 12.

The substrate 12 is formed with, for example, a plywood, particle board, medium density fiberboard (MDF), hardboard, or the like.

The thickness of the substrate 12 is, for example, in the range of 1 [mm] or more and 50 [mm] or less.

Effects of First Embodiment (1) The second surface protective layer 6, which is the outermost layer among the layers constituting the surface protective layer 7, contains an ionizing radiation-curable resin containing a multifunctional hexamethylene diisocyanate oligomer at a weight ratio of 60% or more. Furthermore, the arithmetic mean height of a profile curve measured from the second surface protective layer 6 in accordance with JIS B 0601 is 15 [μm] or more, and the maximum height of the profile curve is 38 [μm] or more.

Since this can improve the hardness of the outermost layer constituting the surface of the decorative sheet 10, scratch resistance on the surface of the decorative sheet 10 can be improved. Also, since the configuration of projections and recesses is defined by the profile curve of the outermost layer from which the arithmetic mean height and the maximum height were identified, a contact area when external load is applied can be reduced.

As a result, there can be provided the decorative sheet 10 which can suppress occurrence of scratches even when projections and recesses are formed on the surface of the decorative sheet 10.

Also, since scratches on the surface of the decorative sheet 10 becomes less noticeable, the design of the decorative sheet 10 can be retained.

(2) The pattern layer 2 is interposed between the thermoplastic resin substrate layer 1 and the transparent thermoplastic resin layer 4.

As a result, the decorative sheet 10 can have an optional pattern appropriate for designability as a decorative material.

(3) The thermoplastic resin substrate layer 1 is formed with a polyolefin-based resin or a polyester-based resin each having a thickness in the range of 10 [μm] or more and 200 [μm] or less.

As a result, reduction in concealing properties, processability, and bending processability for the thermoplastic resin substrate layer 1 can be suppressed.

(4) The transparent thermoplastic resin layer 4 is formed with a polyolefin-based resin or a polyester-based resin each having a thickness in the range of 30 [μm] or more and 200 μm or less.

As a result, reduction in concealing properties, processability, and bending processability for the transparent thermoplastic resin layer 4 can be suppressed.

(5) The surface protective layer 7 is formed by laminating at least one of the first surface protective layer 5 laminated to the transparent thermoplastic resin layer 4, and the second surface protective layer 6 as the outermost layer. In addition, the thickness of the first surface protective layer 5 is in the range of equal to or more than 1 [μm] and less than 30 [μm].

As a result, reduction in bending processability for the surface protective layer 7 can be suppressed.

(6) The decorative material 20 includes the decorative sheet 10, the adhesive layer 11, and the substrate 12 that is bonded to the thermoplastic resin substrate layer 1 by the adhesive contained in the adhesive layer 11.

As a result, there can be provided the decorative material 20 which can suppress occurrence of scratches even when projections and recesses are formed on the surface of the decorative sheet 10.

Also, since scratches on the surface of the decorative sheet 10 become less noticeable, the design of the decorative material 20 can be retained.

(7) The method of producing the decorative sheet 10 includes a transparent thermoplastic resin layer forming process of forming the transparent thermoplastic resin layer 4 on one surface (front surface 1a) of the thermoplastic resin substrate layer 1, and a surface protective layer forming process of forming the surface protective layer 7 on the transparent thermoplastic resin layer 4.

In the surface protective layer forming process, at least an outermost layer (the second protective 6), which is a layer located furthest from the transparent thermoplastic resin layer 4 among the layers constituting the surface protective layer 7, is formed such that it contains an ionizing radiation-curable resin at a weight ratio of 60% or more. The ionizing radiation-curable resin contains a multifunctional hexamethylene diisocyanate oligomer. Furthermore, in the surface protective layer forming process, the second surface protective layer 6 is formed such that the arithmetic mean height of a profile curve measured from the second surface protective layer 6 in accordance with JIS B 0601 is 15 [μm] or more, and the maximum height of the profile curve is 38 [μm] or more.

As a result, there can be provided the method of producing the decorative sheet 10 which can suppress occurrence of scratches even when projections and recesses are formed on the surface of the decorative sheet 10.

The timing for forming projections and recesses is not particularly limited. The process of forming projections and recesses may be performed as an after-process of the transparent thermoplastic resin layer forming process, surface protective layer forming process, or surface protective layer forming process.

In such a case, there can still be provided the method of producing the decorative sheet 10 which can achieve the effects of the present invention, i.e., which can suppress occurrence of scratches.

<Modifications>

(1) The first embodiment has been described for the case where the decorative material 20 shown in FIG. 2 is formed from the decorative sheet 10 shown in FIG. 1. However, a moisture-proof sheet may be provided to the decorative sheet 10 on a side facing a side to be provided with the substrate 12, through an adhesive layer or the like, to configure a decorative sheet. Such a configuration can still achieve the above-described effects.

EXAMPLES

The present invention will be further described in detail by the following examples. However, the present invention is not limited to these examples.

Example 1

The decorative sheet including the main portion according to the first embodiment was prepared using the following materials and procedures.

A thermoplastic resin substrate layer was formed with a 25 [μm]-thick polypropylene film.

The pattern layer was provided on one surface of the polypropylene film constituting the thermoplastic resin substrate layer by printing a wood grain pattern using gravure ink ("Lamistar" manufactured by Toyo Ink Manufacturing Co., Ltd.) by a gravure printing machine.

A two-part urethane-based primer resin containing silica particles was applied by gravure coating to a surface of the thermoplastic resin substrate layer on a side opposite to that facing the pattern layer at a dry thickness of 1 μm.

After the thermoplastic resin rear surface layer was formed, a two-part urethane resin-based adhesive containing polyester polyol as a base resin and isophorone diisocyanate as a curing agent was applied on the pattern layer at a dry thickness of 1 [g/m2].

The transparent adhesive layer and the transparent thermoplastic resin layer were formed by co-extruding a 4 [μm]-thick maleic acid-modified polypropylene resin and a 20 [μm]-thick homopolypropylene (manufactured by Prime Polymer Co., Ltd.) such that the maleic acid-modified polypropylene resin faced the pattern layer.

The first surface protective layer was formed by applying a thermocurable acrylic urethane resin (manufactured by DIC Graphics Corporation) on the surface of the transparent thermoplastic resin layer at a dry thickness of 3 [μm].

The second surface protective layer was formed such that it contains an ionizing radiation-curable resin containing a multifunctional HDI isocyanurate oligomer at a weight ratio of 60% or more. Furthermore, the second surface protective layer was formed such that the arithmetic mean height Pa of a profile curve measured from the second surface protective layer in accordance with JIS B 0601 was 15 [μm], and the maximum height Pz of the profile curve was 38 [μm]. In the present embodiment, the arithmetic mean height Pa was measured by using "Surftest SJ-411 (manufactured by Mitutoyo Corporation)."

Example 2

A decorative sheet of Example 2 was prepared in the same procedure as Example 1, except that the second surface protective layer had a maximum height Pz of 40 [μm].

Example 3

A decorative sheet of Example 3 was prepared in the same procedure as Example 1, except that the second surface protective layer had an arithmetic mean height Pa of 18 [μm].

Example 4

A decorative sheet of Example 4 was prepared in the same procedure as Example 1, except that the second surface protective layer had an arithmetic mean height Pa of 18 [μm] and a maximum height Pz of 40 [μm].

Comparative Example 1

A decorative sheet of Comparative Example 1 was prepared in the same procedure as Example 1, except that the second surface protective layer contained an ionizing radiation-curable resin containing an HDI monomer.

Comparative Example 2

A decorative sheet of Comparative Example 2 was prepared in the same procedure as Example 1, except that the second surface protective layer had an arithmetic mean height Pa of 13 [μm].

Comparative Example 3

A decorative sheet of Comparative Example 3 was prepared in the same procedure as Example 1, except that the second surface protective layer had a maximum height Pz of 36 [μm].

(Performance Evaluation)

The decorative sheet of each of Examples 1 to 4 and Comparative Examples 1 to 3 was bonded to a surface of a 3 [mm]-thick MDF (medium density fiberboard). In bonding the decorative sheet to the MDF, a two-part aqueous emulsion adhesive ("Rikabond" manufactured by Chirika Co., Ltd. (mass ratio BA-10L/BA-11B=100:2.5)) was applied as an adhesive at a grammage of 100 [g/m2] in a wet state. Thereafter, a decorative material formed through curing for 24 hours was evaluated by the following procedure. Table 1 shows the evaluation results.

<Micro-Scratch Test>

The test procedure complies with the European standard "EN 16094." In two test procedures, i.e., MSR-A and MSR-B, which are evaluated on a 1 to 5 scale, 2 or lower was rated as "poor", and 3 or higher was rated as "good." Table 1 shows the evaluation results.

Decorative sheets were prepared in the same manner as the above-described Examples and Comparative Examples, except that the second surface protective layer was formed such that the arithmetic mean height Pa of a profile curve measured from the second surface protective layer in accordance with ISO 3270 or ISO 25178 was 15 [μm], and the maximum height Pz of the profile curve was 38 [μm]. The results were the same as those for the cases in accordance with JIS B 0601 described above. Therefore, the descriptions thereof are omitted.

TABLE 1

| | Material of outermost layer | Pa | Pz | Micro-scratch |
|---|---|---|---|---|
| Example 1 | Multifunctional HDI isocyanurate oligomer | 15 | 38 | Good (B1) |
| Example 2 | Multifunctional HDI isocyanurate oligomer | 15 | 40 | Good (B1) |
| Example 3 | Multifunctional HDI isocyanurate oligomer | 18 | 38 | Good (B1) |
| Example 4 | Multifunctional HDI isocyanurate oligomer | 18 | 40 | Good (B1) |
| Comparative Example 1 | HDI monomer | 15 | 38 | Poor (B2) |
| Comparative Example 2 | Multifunctional HDI isocyanurate oligomer | 13 | 38 | Poor (B2) |
| Comparative Example 3 | Multifunctional HDI isocyanurate oligomer | 15 | 36 | Poor (B2) |

As understood from Table 1, scratch resistances (micro-scratch test) of the decorative materials including the decorative sheets of Examples 1 to 4 are higher than those of the decorative materials including the decorative sheets of Comparative Examples 1 to 3.

This demonstrated that the present invention can provide a decorative sheet, a decorative material, and a method of producing a decorative sheet, which can suppress occurrence of scratches even when projections and recesses are formed on the surface of the decorative sheet.

INDUSTRIAL APPLICABILITY

The decorative sheet, the decorative material, and the method of producing a decorative sheet according to the present invention is suitably applied to floor materials for residential buildings, shops, offices, gymnasiums, and the like, and can also be applied to other applications.

REFERENCE SIGNS LIST

1 . . . Thermoplastic resin substrate layer; 2 . . . Pattern layer; 3 . . . Transparent adhesive layer; 4 . . . Transparent thermoplastic resin layer; 5 . . . First surface protective layer; 6 . . . Second surface protective layer (outermost layer); 7 . . . Surface protective layer; 8 . . . Thermoplastic resin rear surface layer; 10 . . . Decorative sheet; 11 . . . Adhesive layer; 12 . . . Substrate; 20 . . . Decorative material.

What is claimed is:

1. A decorative sheet, comprising:
   at least a thermoplastic resin substrate layer, a transparent thermoplastic resin layer, and a surface protective layer in this order,
   wherein the surface protective layer is formed by laminating at least two layers;
   wherein at least an outermost layer that is a layer located furthest from the transparent thermoplastic resin layer among layers constituting the surface protective layer contains an ionizing radiation-curable resin containing a multifunctional hexamethylene diisocyanate oligomer at a weight ratio of 60% or more, and,
   wherein the arithmetic mean height of a profile curve measured from the outermost layer in accordance with JIS B 0601 is 15 µm or more, and the maximum height of the profile curve is 38 µm or more.

2. The decorative sheet of claim 1, further comprising a pattern layer interposed between the thermoplastic resin substrate layer and the transparent thermoplastic resin layer.

3. The decorative sheet of claim 1, wherein the thermoplastic resin substrate layer is formed with a polyolefin-based resin or a polyester-based resin each having a thickness in the range of 10 µm or more and 200 µm or less.

4. The decorative sheet of claim 1, wherein the transparent thermoplastic resin layer is formed with a polyolefin-based resin or a polyester-based resin each having a thickness in the range of 30 µm or more and 200 µm or less.

5. The decorative sheet of claim 1, wherein
   the surface protective layer is formed by laminating at least one of a first surface protective layer which is laminated to the transparent thermoplastic resin layer, and the outermost layer, and
   the thickness of the first surface protective layer is in the range of equal to or more than 1 µm and less than 30 µm.

6. A decorative material, comprising:
   the decorative sheet of claim 1;
   an adhesive layer that is provided on a surface of the thermoplastic resin substrate layer on a side facing a surface closer to the transparent thermoplastic resin layer, and contains an adhesive; and
   a substrate that is bonded to the thermoplastic resin substrate layer through the adhesive contained in the adhesive layer.

7. A method of producing a decorative sheet, comprising:
   a transparent thermoplastic resin layer forming process of forming a transparent thermoplastic resin layer on one surface of a thermoplastic resin substrate layer; and
   a surface protective layer forming process of forming a surface protective layer formed by laminating at least two layers on the transparent thermoplastic resin layer,
   characterized in that the surface protective layer forming process includes forming at least an outermost layer that is a layer located furthest from the transparent thermoplastic resin layer among layers constituting the surface protective layer, such that
   the outermost layer contains an ionizing radiation-curable resin containing a multifunctional hexamethylene diisocyanate oligomer at a weight ratio of 60% or more, and
   the arithmetic mean height of a profile curve measured from the outermost layer in accordance with JIS B 0601 is 15 µm or more, and the maximum height of the profile curve is 38 µm or more.

8. The decorative sheet of claim 1, wherein the arithmetic mean height of a profile curve measured from the outermost layer in accordance with JIS B 0601 is 15 µm or more and 30 µm or less, and the maximum height of the profile curve is 38 µm or more and 80 µm or less.

9. The decorative sheet of claim 1, wherein the maximum height of the profile curve is equal to or more than 2.4 times and equal to or less than 2.7 times the arithmetic mean height of the profile curve.

10. The decorative sheet of claim 8, wherein the maximum height of the profile curve is equal to or more than 2.4 times and equal to or less than 2.7 times the arithmetic mean height of the profile curve.

11. The method of claim 7, wherein the arithmetic mean height of a profile curve measured from the outermost layer in accordance with JIS B 0601 is 15 µm or more and 30 µm or less, and the maximum height of the profile curve is 38 µm or more and 80 µm or less.

12. The method of claim 7, wherein the maximum height of the profile curve is equal to or more than 2.4 times and equal to or less than 2.7 times the arithmetic mean height of the profile curve.

13. The method of claim 9, wherein the maximum height of the profile curve is equal to or more than 2.4 times and equal to or less than 2.7 times the arithmetic mean height of the profile curve.

* * * * *